United States Patent
Tsai

(10) Patent No.: US 7,802,727 B1
(45) Date of Patent: Sep. 28, 2010

(54) MEMORY CARD CONNECTOR HAVING USER IDENTIFICATION FUNCTIONALITY

(76) Inventor: Chung-Jung Tsai, 2F-4, No. 148, Sec. 4, Chung Hsiao East Road, Taipei (TW)

( * ) Notice: Subject to any disclaimer, the term of this patent is extended or adjusted under 35 U.S.C. 154(b) by 1291 days.

(21) Appl. No.: 10/708,637

(22) Filed: Mar. 17, 2004

(51) Int. Cl.
*G06K 13/06* (2006.01)

(52) U.S. Cl. .................. 235/483; 235/492; 235/439; 235/441; 235/449; 235/375; 235/486; 235/451; 235/380; 439/326; 439/630; 439/66; 710/1; 710/300

(58) Field of Classification Search .......... 235/483, 235/492, 439, 441, 449, 375, 486, 451, 380; 439/326, 630, 66; 710/1, 300
See application file for complete search history.

(56) References Cited

U.S. PATENT DOCUMENTS

| | | | |
|---|---|---|---|
| 2002/0047045 A1* | 4/2002 | Song et al. ................. | 235/441 |
| 2002/0055291 A1* | 5/2002 | Maiterth et al. ............ | 439/326 |
| 2002/0168900 A1* | 11/2002 | Chen ......................... | 439/630 |
| 2003/0064627 A1* | 4/2003 | Ooya et al. ................. | 439/630 |
| 2003/0115047 A1* | 6/2003 | Mekuria ..................... | 704/219 |
| 2003/0181078 A1* | 9/2003 | Huang et al. ............... | 439/76.1 |
| 2004/0005910 A1* | 1/2004 | Tom .......................... | 455/558 |
| 2004/0006655 A1* | 1/2004 | Toffolet ...................... | 710/1 |
| 2004/0050938 A1* | 3/2004 | Yamaguchi ................. | 235/483 |
| 2004/0094618 A1* | 5/2004 | Okamura et al. ........... | 235/380 |
| 2004/0121629 A1* | 6/2004 | You ........................... | 439/66 |
| 2004/0172492 A1* | 9/2004 | Farnworth et al. ......... | 710/300 |
| 2004/0209648 A1* | 10/2004 | Chen ......................... | 455/558 |

* cited by examiner

*Primary Examiner*—Allyson N Trail

(57) ABSTRACT

A memory card connector having user identification functionality is provided. The memory card connector has a connector and a cover. The connector encloses a space in which a memory card module and a user identification module are disposed, wherein a partition disposed in the space separates the memory card module and the user identification module, and wherein the memory card module is adapted for receiving a memory card and the user identification module is for receiving a user identification card. The memory card module has a conductive terminal set at one end thereof and the user identification module has a conductive terminal set at a backside thereof for providing user identification functionality. The cover covers a top of the connector.

2 Claims, 4 Drawing Sheets

MEMORY CARD CONNECTOR HAVING USER IDENTIFICATION FUNCTIONALITY

BACKGROUND OF INVENTION

The present invention generally relates to a memory card connector, and more particularly to a memory card having user identification functionality.

The mobile phone has become a popular tool in today's modern society, and the population of the mobile phone users is increasing since the mobile phone is considered as a part of fashion. Corresponding to the increased number of the mobile phone, there are increased number of types and models of mobile phones available on the market, starting from the prototype, huge and heavy, to the latest smaller, lighter, portable and better reception. Today's mobile phone multifunctional, for instance, taking still pictures, sending/receiving electronic mails, a variety of ringer tone selections, taking motion pictures, downloading information and software from the internet, and the like. With the increasing new functionalities, the mobile phone needs to have larger memory capacity for storing more data. Since the conventional mobile phone does not have large memory capacity, and therefore the conventional mobile phone cannot perform the functions, such as taking still and motion pictures, sending and receiving electronic mails, and so on. Although the general computer has larger memory space, but without the security functionality, for example, user identification functionality, important and classified data, such as, company's internal confidential files, customers information, accounting and sales data and the like, can be easily accessed by any unauthorized user.

The conventional memory card connectors, a single memory card connector is designed for receiving a single memory card and a multiple memory card connector, which has a plurality of slots, is designed for receiving a variety of types of memory cards. Though the conventional memory card connector provides the convenience of receiving a variety of memory cards and read information stored therein or store information therein, however, it lacks security functionality. In other words, information stored into the memory card can be read by anybody using a memory card reader. Accordingly, the conventional card connector only provides for memory storage but lacks security functionality for protecting the personal or classified information and for preventing any unauthorized person from getting access to the information stored in the memory card.

Therefore, it is highly desirable to develop a memory card connector with security functionality for preventing any unauthorized person from getting access to the information stored in the memory card.

SUMMARY OF INVENTION

Accordingly, in the view of the foregoing, the present inventor makes a detailed study of related art to evaluate and consider, and uses years of accumulated experience in this field, and through several experiments, to create a new memory card connector having user identification functionality. The present invention provides an innovated cost effective memory card connector having user identification functionality.

According to an aspect of the present invention, the memory card connector comprises a memory card module and a user identification module. The memory card module comprises a conductive terminal set at one end thereof. The user identification module comprises a conductive terminal set at a backside thereof. A cover covers the top of the memory card connector. The memory card and the user identification card can be inserted into the connector at the same time for electrically connecting with the host via the conductive terminal set and for providing memory storage and user identification functionalities.

According to another feature of the present invention, a moving mechanism is set adjacent to the memory card module for receiving or releasing the memory card within the memory card module.

According to another aspect of the present invention, the memory card module has a detecting terminal and ground terminal positioned on two sides respectively for detecting whether the memory card is in correct position and for preventing the memory card from interference.

BRIEF DESCRIPTION OF DRAWINGS

For a more complete understanding of the present invention, reference will now be made to the following detailed description of preferred embodiments taken in conjunction with the following accompanying drawings.

DETAILED DESCRIPTION

Figure 1:
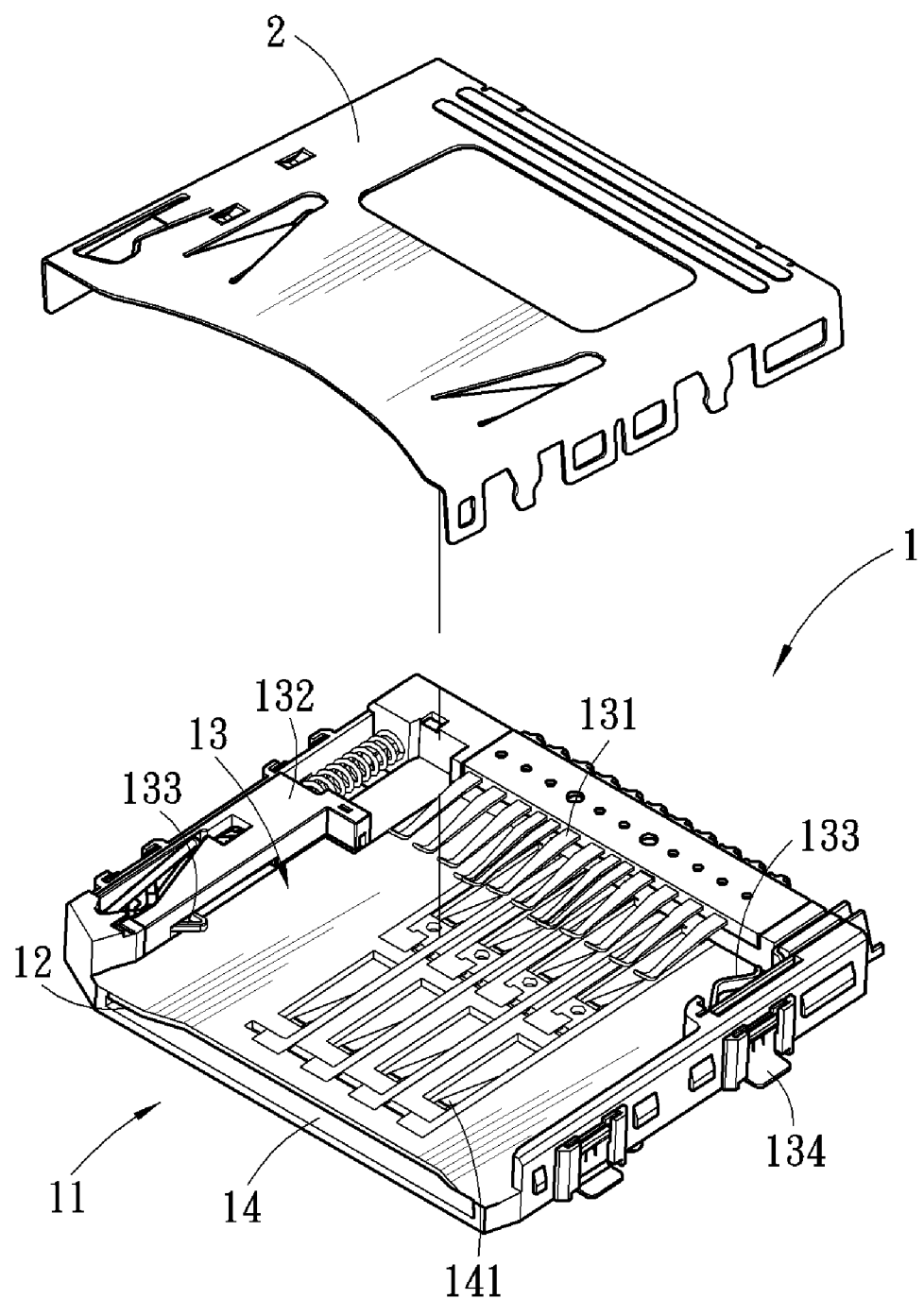
FIG. 1 is an exploded view of a memory card connector according to an embodiment of the present invention.

Reference will be made in detail to the preferred embodiments of the invention, examples of which are illustrated in the accompanying drawings. Wherever possible, the same reference numbers are used in the drawings and the description to refer to the same or like parts.

Figure 2:
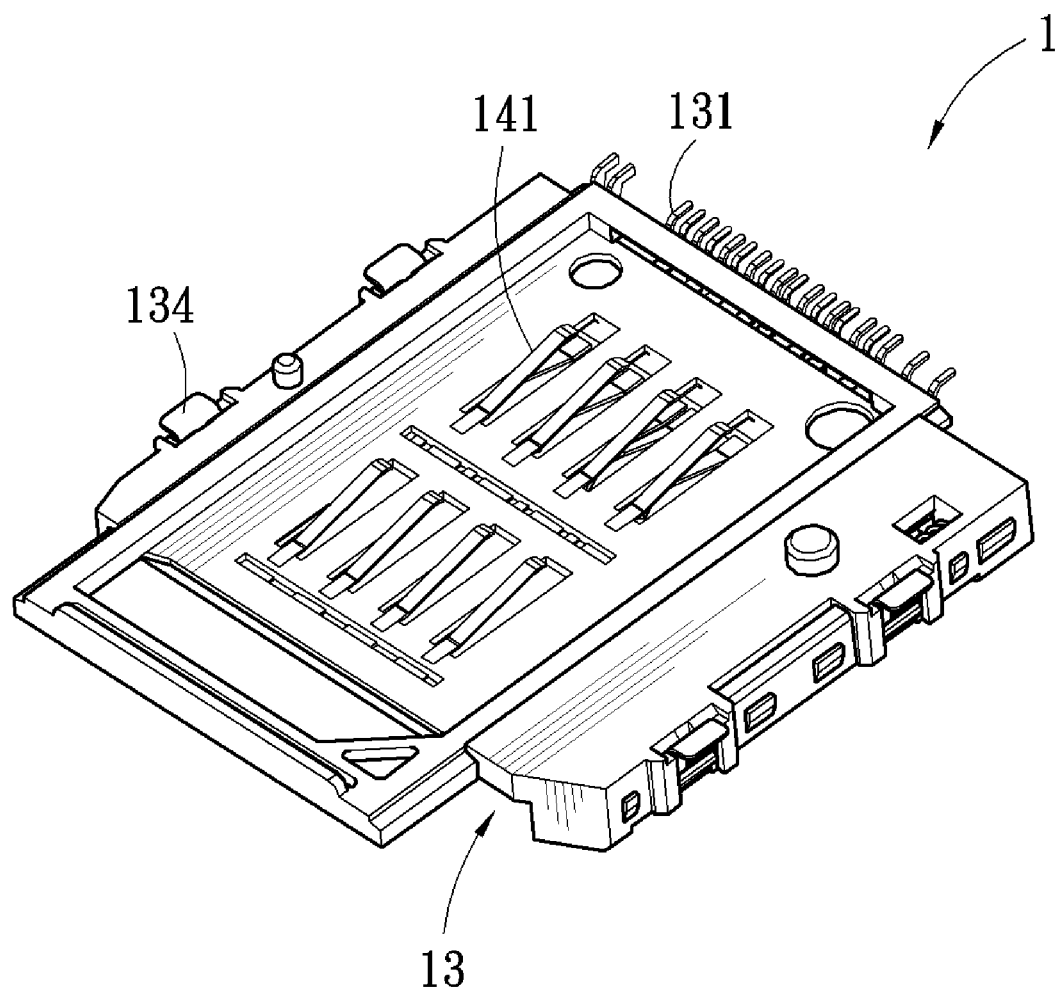
FIG. 2 is an elevational view of a backside of a memory card connector according to an embodiment of the present invention.

FIGS. 1 and 2 respectively show an exploded view and an elevational view of a backside of a memory card connector according to an embodiment of the present invention. The memory card connector comprises a connector 1 and a cover 2.

The connector 1 encloses a space 11 in which a memory card module 13 and a user identification module 14 are disposed. A partition 12 is disposed in the space 11 for separating the memory card module 13 and the user identification module 14. The memory card module 13 comprises a conductive terminal set 131 at one end thereof. The user identification module 14 comprises a conductive terminal set 141 at a backside thereof. A moving mechanism 132 is set at the other side of the memory card module 13. Furthermore, the memory card module 13 comprises a detection terminal 133 and ground terminal 134 on two sides thereof. The cover 2 covers a top of the connector 1.

Figure 3:
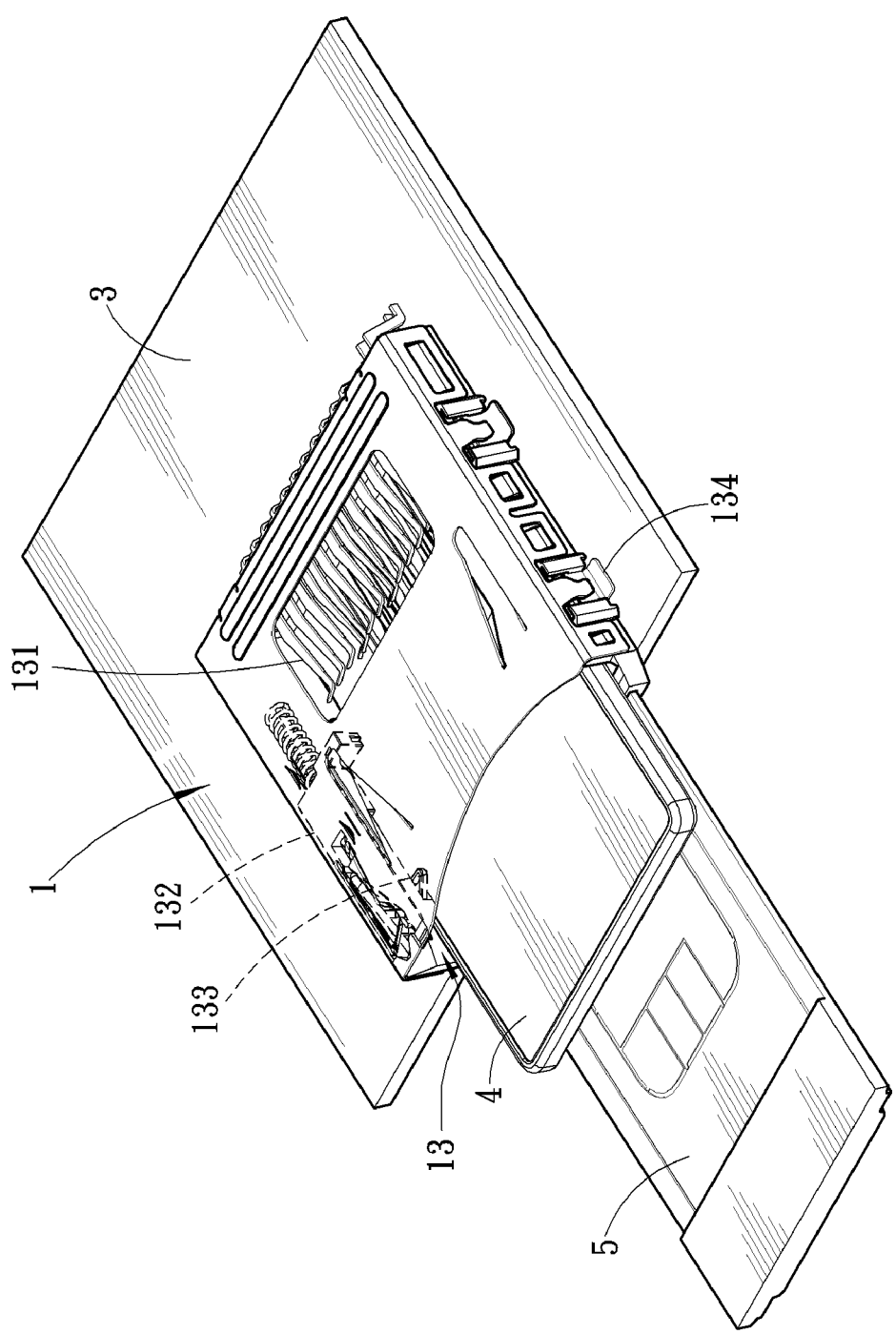
FIG. 3 is an elevation al view showing while inserting a memory card and a user identification card into a memory card connector according to an embodiment of the present invention.
Figure 4:
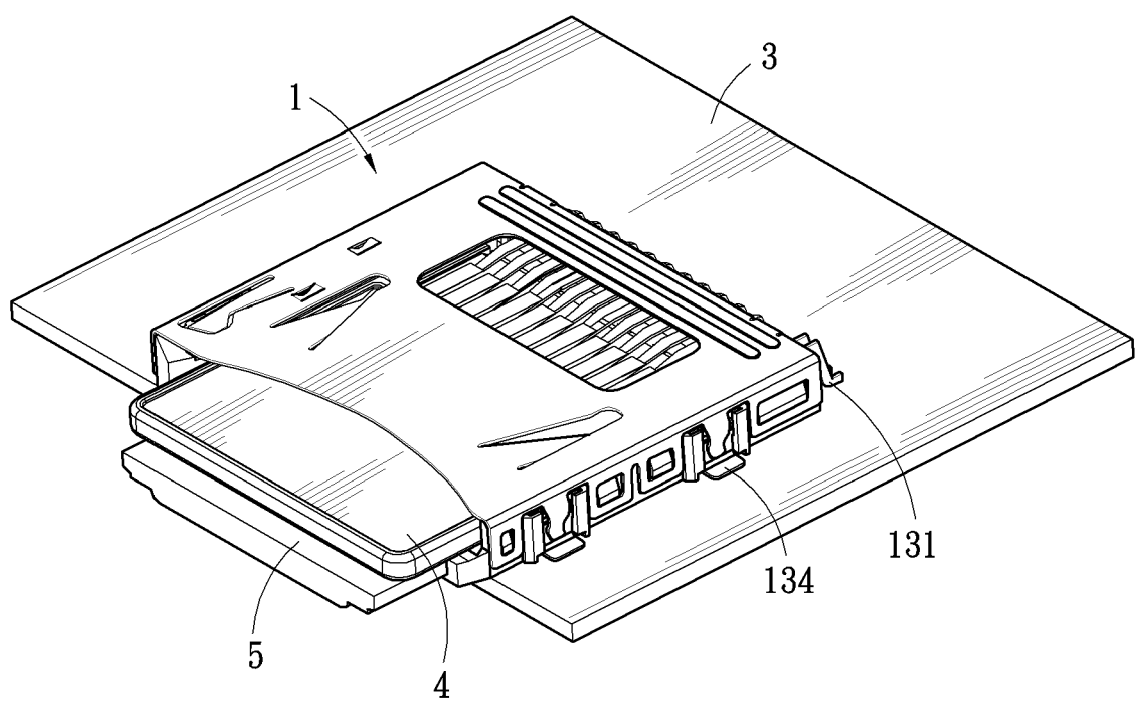
FIG. 4 is an elevational view showing after inserting a memory card and an identification card into a memory card connector according to an embodiment of the present invention.

FIGS. 3 and 4 respectively show an elevational view of while and after inserting a memory card and an identification card into the memory card connector of the present invention. As shown in FIGS. 3 and 4, the connector 1 is positioned on the circuit board 3, and the memory card 4 is inserted into the memory card module 13 for electrically connecting to the circuit board 3. The moving mechanism 132 is for securely positioning the memory card 4 within the memory card module 13. The user identification card 5 is inserted into the user identification module 14 to electrically connect to the circuit board 3. After the memory card 4 and the user identification card 5 are respectively inserted into the memory card module 13 and the user identification module 14, an end portion of the memory card 4 and the user identification card 5 are exposed outside the memory card module 13 and the user identification module 14 to enable the user to easily pull out the memory card 4 and the user identification card 5 from the memory card module 13 and the user identification module 14. Further, the detecting terminal 133 is adapted for sensing whether or not the memory card 4 is in proper position and the ground terminal 134 is for preventing the memory card connector from interferences.

Furthermore, the connector 1 can be applied in the computer and the mobile phone. Accordingly, the memory card connector of the present invention can provide user identification functionality to protect the data stored in the memory from any unauthorized person. Therefore, the present invention provides data storage expansion as well as security functionalities.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

The invention claimed is:

1. A memory card connector having user identification functionality, suitable for application in a personal computer and a mobile phone, the memory card connector comprising:
   a connector, enclosing a space in which a memory card module and a user identification module are being disposed, wherein a partition disposed in said space separates the memory card module and the user identification module, wherein said memory card module comprises a conductive terminal set at one end thereof and said user identification module comprises a conductive terminal set at a backside thereof;
   a user identification card, disposed in said user identification module, wherein said user identification card allows an authorized user to read/transmit information stored in a memory card inserted in said memory card module and store information in said memory card, wherein said memory card is previously programmed with authorization to access/store information in said memory card by said authorized user; and
   a cover, covering a top of said connector.

2. A memory card connector having user identification functionality, suitable for application in a personal computer and a mobile phone, the memory card connector comprising:
   a connector, enclosing a space in which a memory card module and a user identification module are being disposed, wherein a partition disposed in said space separates the memory card module and the user identification module, wherein said memory card module comprises a conductive terminal set at one end thereof and said user identification module comprises a conductive terminal set at a backside thereof;
   identification means, for identifying an authorized user and allowing said authorized user to read/transmit information stored in a memory card inserted in said memory card module and store information in said memory card, wherein said memory card is previously programmed with authorization to access/store information in said memory card by said authorized user, wherein said identification means comprises a user identification card disposed in said user identification module; and
   a cover, covering a top of said connector.

* * * * *